April 17, 1928. 1,666,142
P. J. McCRINK
RIM SPREADER
Filed Sept. 2 1926
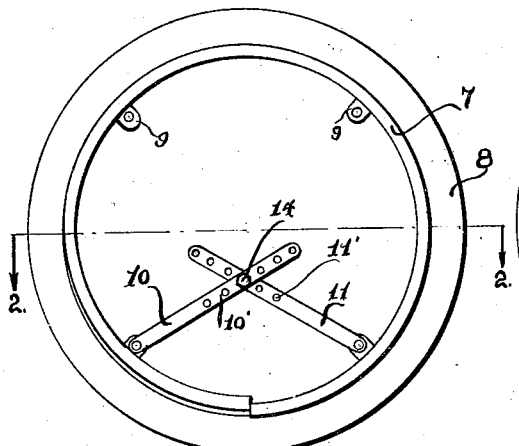
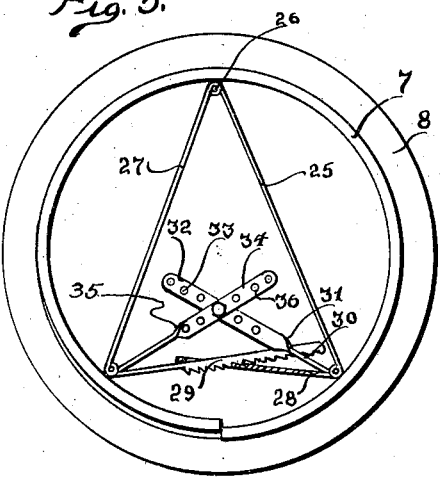
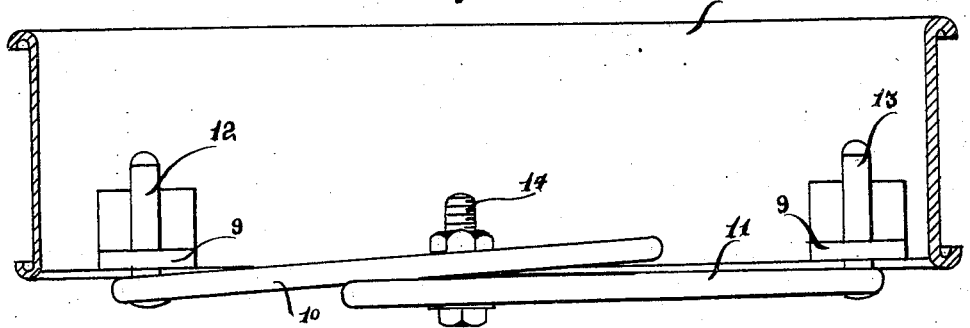
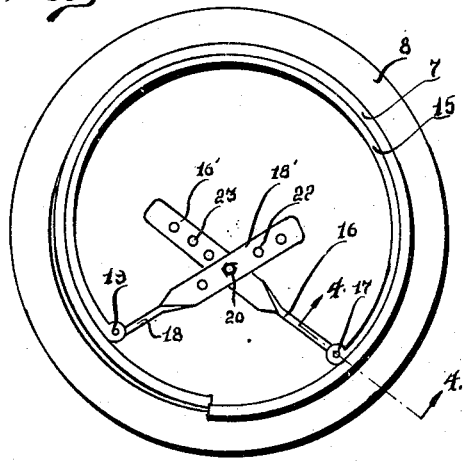
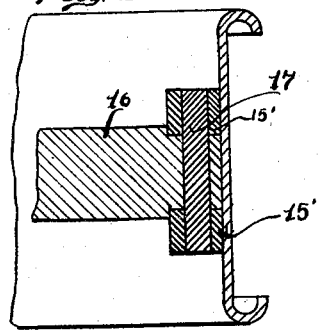
INVENTOR.
Patrick J. McCrink
BY
ATTORNEY.

Patented Apr. 17, 1928.

1,666,142

UNITED STATES PATENT OFFICE.

PATRICK J. McCRINK, OF DETROIT, MICHIGAN.

RIM SPREADER.

Application filed September 2, 1926. Serial No. 133,135.

My invention relates to a new and useful improvement in a rim spreader adapted for spreading slit rims of vehicles to permit the edges to engage so as to form a true circle. The rim referred to is that type which is customarily used with automobiles on which is positioned a tire and in order to remove the tire the engaging ends of the split rim are brought into overlapping relation, so as to reduce the diameter of the rim and permit an easy removal of the tire therefrom. When the tire is replaced on the rim it is necessary to exert considerable force against the resiliency of the metal rim in order to bring the overlapping edges into engagement with each other. To effect this in an easy and simple manner is an object of the invention.

Another object of the invention is the provision of a rim spreader of this class which will be simple in structure, economical of manufacture and highly efficient in use.

Another object of the invention is the provision of a rim spreader of this class embodying the toggle principle for effecting the spreading of the rim while at the same time the device may be folded into a small space and carried in the usual tool box of the vehicle.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention showing it applied to a rim.

Fig. 2 is a sectional view taken on substantially line 2—2 of Fig. 1.

Fig. 3 is a side elevational view of a modified form of the invention.

Fig. 4 is a fragmentary sectional view taken on substantially line 4—4 of Fig. 3.

Fig. 5 is a side elevational view of a further modified form of the invention showing it applied.

In the drawings I have shown the metallic split rim 7 on which is mounted the usual pneumatic tire 8. Projecting inwardly from the rim 7 are eyelet bearing lugs 9, whereby the rim is customarily secured to the felly of the wheel. The invention comprises a pair of metallic bars 10 and 11 provided with a plurality of openings 10′ and 11′ respectively. Projecting laterally outwardly from the end of the bar 10 is a stud 12 adapted for insertion through the opening of one of the lugs 9. A similar laterally projecting lug 13 is secured to the end of the bar 11, these bars being pivoted by means of a bolt 14 projected through one of the openings 11′ and 10′. After the tire has been placed upon the rim 7, the edges of which are overlapping, studs 12 and 13 are engaged in the openings of the lugs 9, the bars 10 and 11 being pivoted by the bolt 14 projected through suitable openings 10′ and 11′ depending upon the size of the rim operated upon. The operator may then, by pressing downwardly on the bars 10 and 11 with his foot, or in any other desired manner, force the rim outwardly so as to bring the edges into non-overlapping position and permit the edges of the rim at the slit to engage each other.

It is evident that the operation of the device is simple and that its structure is one which will permit its manufacture and sale at a low cost. When packed in the tool the bars 10 and 11 are overlapped on their pivot so that they occupy but little space.

In the preferred form I have shown the principle of the invention applied for use in spreading a tire rim which is equipped with the lugs 9, some rims having been manufactured and sold free from lugs 9.

In the modified form, shown in Fig. 3 and Fig. 4, I have provided a substantially circular member 15, which in operation, is positioned in engagement with the inner surface of the tire rim 7. The ends of this circular member 15 are curved to form knuckles 15′. Pivotally mounted between the knuckles 15′ is one end of a bar 16 having the major portion of its link 16′ turned to lie in a plane at right angles to the connected end. A similar bar 18, having the turned portion 18′, is pivotally connected by means of the pintle 19. A bolt 20 serves to connect the portions 16′ and 18′, these portions being provided with a plurality of openings 23 and 22, respectively. The principle of operation is as already described, pressure exerted downwardly on the bars 16′ and 18′ effecting a withdrawal of the ends of the circular member 15 so that a spreading of the tire is effected to the extent desired.

In the further modified form shown in Fig. 5, I have provided a method of locking the spreading mechanism in any desired position so that, should it become necessary to readjust the device for a greater spreading, the rim will be held in the position of spreading already effected while the adjustment is being made.

This further modified form comprises a bar 25 which is hingedly connected at 26 to a bar 27. Rigidly connected to the end of the bar 25 is an arm 28 which is provided at its free end with a slot in which engages an arm 29, provided with teeth for engaging the base of the slot, this arm 29 being hingedly connected at its end of the bar 27. Hingedly connected to the bar 25 is an arm 30, which is angularly turned at 31 to provide a portion 32, having a plurality of openings 33 formed therein and adapted to lie in engagement with the bar 34 which is angularly turned at 35, this bar 34 having the openings 36 formed therein. In use the device is operated in the same manner as the forms already described, the pressure being exerted downwardly in the point of pivot with which the members 32 and 34 are pivoted together. As this downward pressure is exerted the bars 25 and 27 are forced apart to force the rims 7 outwardly, the arm 29 riding over the base of the slot formed in the arm 28 so that when the pressure is released on the members 32 and 34, these teeth will prevent inward movement of the bars 25 and 27. It is believed evident, therefore, that an adjustment of the point of the pivotal connection of the bars 32 and 34 with each other may be effected while the bars 25 and 27 are locked in an outwardly spreading position.

While I have illustrated and described the preferred form of my invention, I do not wish to limit myself to the precise form of structure shown, but desire to avail myself of such variation and modifications as may come within the scope of the appended claim.

Having thus described my invention what I claim as new and desire to secure by Letters Patent is:

A rim spreader of the class described comprising a pair of bars pivotally connected together at one end, a pair of arms, each connected at one end pivotally to the opposite end of said bars; means for connecting said arms in pivotal relationship to each other adjacent their free ends; a slot bearing arm fixedly connected to the free end of one of said bars and projecting toward the other of said bars; and a tooth bearing arm pivotally connected to the free end of the other of said bars and engaging in said slot for resisting movement of said bars inwardly towards each other.

In testimony whereof I have signed the foregoing.

PATRICK J. McCRINK.